(12) United States Patent
Chen

(10) Patent No.: US 8,123,298 B2
(45) Date of Patent: Feb. 28, 2012

(54) HINGE ASSEMBLY FOR BOAT SEAT

(75) Inventor: Kate Chen, Corinth, TX (US)

(73) Assignee: Friend Success, Inc., Corinth, TX (US)

( * ) Notice: Subject to any disclaimer, the term of this patent is extended or adjusted under 35 U.S.C. 154(b) by 99 days.

(21) Appl. No.: 12/557,286

(22) Filed: Sep. 10, 2009

(65) Prior Publication Data

US 2011/0057499 A1    Mar. 10, 2011

(51) Int. Cl.
  *B60N 2/20* (2006.01)
  *B60N 2/30* (2006.01)
(52) U.S. Cl. .................................................. 297/378.1
(58) Field of Classification Search ............... 297/378.1, 297/378.12
  See application file for complete search history.

(56) References Cited

U.S. PATENT DOCUMENTS

| | | | | |
|---|---|---|---|---|
| 4,147,386 A * | 4/1979 | Stolper | ................ | 297/378.12 X |
| 5,020,853 A * | 6/1991 | Babbs | .......................... | 297/341 |
| 5,052,076 A * | 10/1991 | Spaeth | ............................ | 16/266 |
| 5,725,279 A * | 3/1998 | Ward et al. | ................. | 297/378.1 |
| 5,956,810 A * | 9/1999 | Spaeth | ...................... | 297/376 X |
| 6,045,190 A * | 4/2000 | Ward et al. | ................. | 297/378.1 |
| 6,113,190 A * | 9/2000 | Negi et al. | .................. | 297/378.1 |
| 6,186,595 B1 * | 2/2001 | Ward et al. | ................. | 297/378.1 |
| 6,290,297 B1 * | 9/2001 | Yu | ............................ | 297/378.12 |
| 6,353,970 B1 * | 3/2002 | Spaeth | ................... | 297/378.1 X |
| 6,543,850 B1 * | 4/2003 | Becker et al. | ................. | 297/362 |
| 6,546,595 B2 * | 4/2003 | Huse | ............................... | 16/326 |
| 6,749,262 B2 * | 6/2004 | Schaffner et al. | ...... | 297/378.1 X |
| 7,097,253 B2 * | 8/2006 | Coughlin et al. | ........ | 297/378.12 |
| 7,152,923 B2 * | 12/2006 | Charras et al. | ......... | 297/378.1 X |
| 7,156,463 B2 * | 1/2007 | Taubmann et al. | ..... | 297/378.1 X |
| 7,364,237 B2 * | 4/2008 | Grable et al. | .............. | 297/378.1 |
| 7,367,624 B2 * | 5/2008 | Garland | .................. | 297/378.1 X |
| 7,434,883 B2 * | 10/2008 | Deptolla | ................ | 297/378.1 X |
| 7,543,890 B1 * | 6/2009 | Sasaki et al. | ............ | 297/378.1 X |
| 7,556,315 B2 * | 7/2009 | Nathan et al. | .......... | 297/378.1 X |
| 7,775,591 B2 * | 8/2010 | Hahn et al. | ............. | 297/378.1 X |
| 7,871,127 B2 * | 1/2011 | Bruck et al. | ............ | 297/378.1 X |
| 7,871,128 B2 * | 1/2011 | Bonk et al. | ............. | 297/378.1 X |
| 2005/0156455 A1 * | 7/2005 | Deptolla | .................. | 297/378.12 |
| 2007/0029858 A1 * | 2/2007 | Grable et al. | .............. | 297/378.1 |
| 2009/0079249 A1 * | 3/2009 | Nathan et al. | .............. | 297/378.1 |
| 2010/0109388 A1 * | 5/2010 | Habedank et al. | ..... | 297/378.1 X |

* cited by examiner

*Primary Examiner* — Rodney B White
(74) *Attorney, Agent, or Firm* — Howison & Arnott, L.L.P.

(57) ABSTRACT

An embodiment of a hinge assembly includes a seat back support, a seat bottom support, a hinge pivot, and a stop pin. The seat back support has a seat back mounting portion and a seat back hinge portion. The seat back hinge portion includes a stop notch formed at an end of the seat back hinge portion. The seat bottom support has a seat bottom mounting portion and a seat bottom hinge portion. The hinge pivot passes through the seat back hinge portion and the seat bottom hinge portion to hingedly couple the seat back hinge portion to the seat bottom portion. The stop pin has a stop pin shaft and a stop pin head positioned at a first end of the stop pin shaft. A second end of the stop pin shaft is affixed to the seat bottom hinge portion of the seat bottom support proximate to the seat back hinge portion of the seat back support.

16 Claims, 6 Drawing Sheets

HINGE ASSEMBLY FOR BOAT SEAT

TECHNICAL FIELD

Embodiments of the invention are related to the field of furniture and, more specifically, to a hinge assembly for a boat seat allowing a seat back to be raised and lowered.

BACKGROUND

Seats may be used in many different environments. One such environment is on boats or other watercraft. Boat seats allow a user of a boat or other watercraft to be seated in a comfortable position to increase the user's enjoyment of the boating experience. It is often desirable for a boat seat to possess the capability for the seat back to be lowered into a stowed position by a user when the boat seat is not in use to position it out of the way, and to be raised to an extended position when the user wishes to sit on the boat seat.

SUMMARY

An embodiment of a hinge assembly includes a seat back support, a seat bottom support, a hinge pivot, and a stop pin. The seat back support has a seat back mounting portion and a seat back hinge portion distally located from the seat back mounting portion. The seat back hinge portion includes a stop notch formed at an end of the seat back hinge portion. The seat bottom support has a seat bottom mounting portion and a seat bottom hinge portion distally located from the seat bottom mounting portion. The hinge pivot is positioned distally from the seat back mounting portion and passes through the seat back hinge portion and the seat bottom hinge portion to hingedly couple the seat back hinge portion to the seat bottom hinge portion. The stop pin has a stop pin shaft and a stop pin head positioned at a first end of the stop pin shaft. The second end of the stop pin shaft is affixed to the seat bottom hinge portion of the seat bottom support proximate to the seat back hinge portion of the seat back support. The stop pin shaft of the stop pin is configured to engage the stop notch upon rotation of the seat back support from a folded position to an extended position. A portion of the seat back hinge portion is disposed between and guided by the stop pin head of the stop pin and the seat bottom hinge portion of the seat bottom support during a substantial portion of rotation of the seat back support from the folded position to the extended position, without substantial contact of the seat back hinge portion to the stop pin shaft until the stop notch comes into contact with the stop pin shaft upon the seat back support reaching the extended position.

Another embodiment of a hinge assembly includes a seat back support, a seat bottom support, a hinge pivot, and a stop pin. The seat back support has a seat back mounting portion comprised of a longitudinal flat plate with upper and lower parallel surfaces and a seat back hinge portion distally located at an end of the seat back mounting portion. The seat back hinge portion includes a stop notch integrally formed in the outer surface at the distal end of the seat back hinge portion. The seat bottom support has a seat bottom mounting portion and a seat bottom hinge portion distally located from the seat bottom mounting portion, wherein the distal end of the seat bottom hinge portion has a flat surface which is recessed with respect to a first surface of the seat bottom support. The recessing of the seat bottom hinge portion with respect to the first surface allows the first surface of the seat bottom support to lie substantially in the same plane as a second surface of the seat back hinge portion that comprises one of the surfaces of the flat plate of the seat back mounting portion. The hinge pivot is positioned distally from the seat back mounting portion proximate to the end of the flat plate and passes there through and through the flat surface on the seat bottom hinge portion to hingedly couple the seat back hinge portion to the seat bottom hinge portion.

The stop pin has a stop pin shaft and a stop pin head positioned at a first end of the stop pin shaft. A second end of the stop pin shaft is affixed to the seat bottom hinge portion of the seat bottom support proximate to the seat back hinge portion of the seat back support and extending perpendicular thereto. The stop pin head is larger than the stop pin shaft and in a plane perpendicular thereto. The stop pin shaft of the stop pin is configured to engage the stop notch upon rotation of the seat back support from a folded position to an extended position. A portion of the distal end of the seat back hinge portion is disposed between and guided by the stop pin head of the stop pin and the seat bottom hinge portion of the seat bottom support during a substantial portion of rotation of the seat back support from the folded position to the extended position such that the distal end of the seat back hinge portion slides substantially unimpeded between a lower surface of the stop pin head and the flat surface of the seat bottom hinge portion, without substantial contact of the seat back hinge portion to the stop pin shaft until the stop notch comes into contact with the stop pin shaft upon the seat back support reaching the extended position.

BRIEF DESCRIPTION OF THE DRAWINGS

For a more complete understanding, reference is now made to the following description taken in conjunction with the accompanying Drawings in which.

DETAILED DESCRIPTION

Figure 1A:
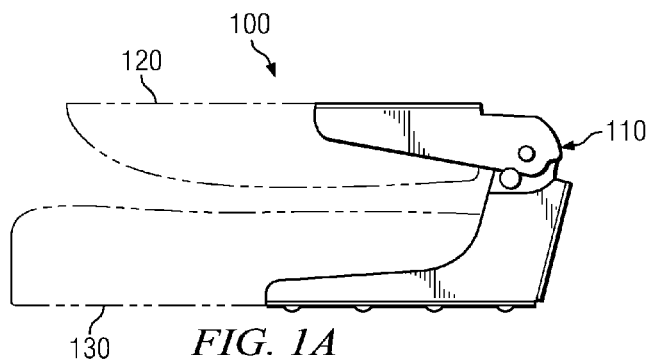
FIG. 1A illustrates a left side view of an embodiment of a boat seat in a folded position.

Referring now to the drawings, wherein like reference numbers are used herein to designate like elements throughout, the various views and embodiments of HINGE ASSEMBLY FOR BOAT SEAT are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 1B:
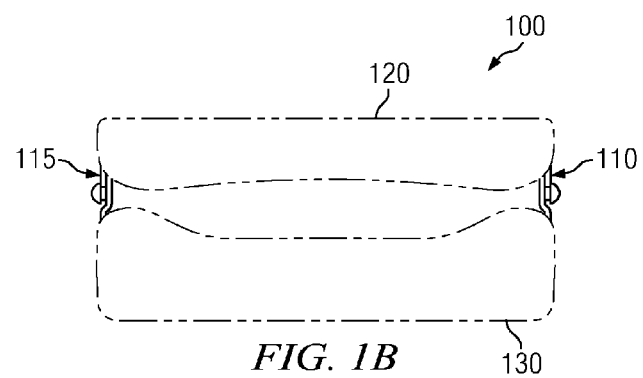
FIG. 1B illustrates a front view of the boat seat of FIG. 1A in the folded position.
Figure 1C:
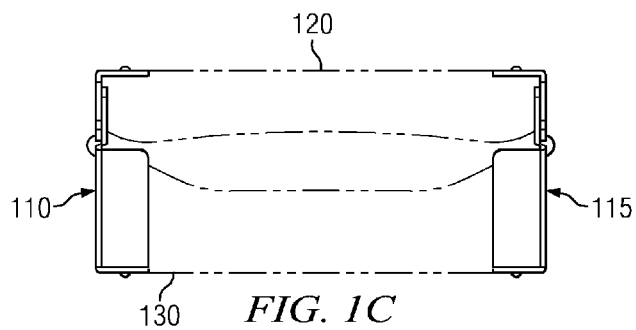
FIG. 1C illustrates a rear view of the boat seat of FIG. 1A in the folded position.
Figure 1D:
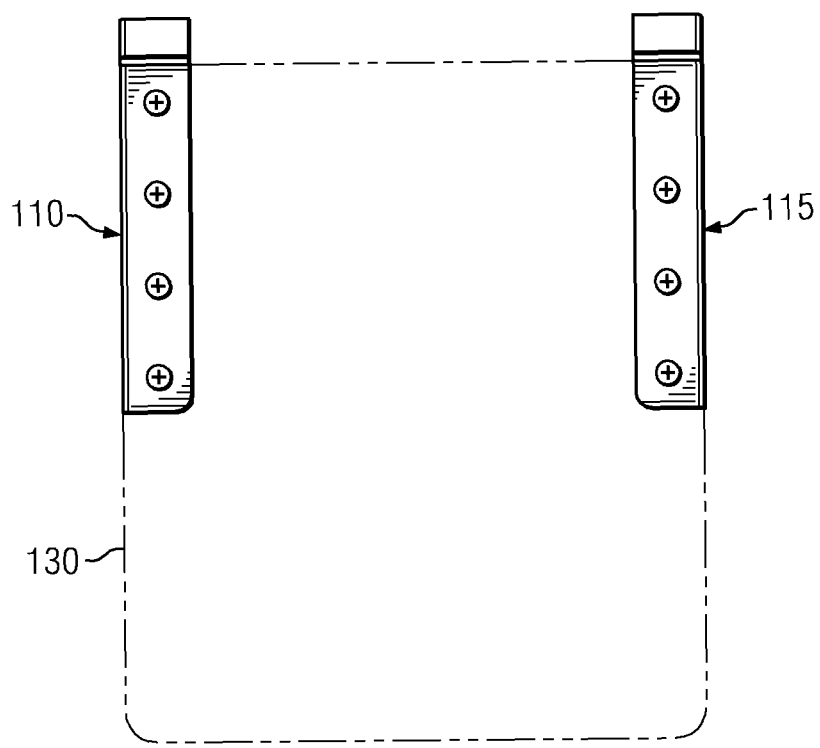
FIG. 1D illustrates a bottom view of the boat seat of FIG. 1A in the folded position.

Referring now to FIG. 1A, a left side view of an embodiment of a boat seat 100 in a folded position is illustrated. The boat seat 100 includes a seat back 120 and seat bottom 130 coupled to a left hinge assembly 110. FIG. 1B illustrates a front view of the boat seat 100 of FIG. 1A in the folded position. As illustrated in FIG. 1B, the boat seat 100 further includes a right hinge assembly 115 coupled to the seat back 120 and the seat bottom 130. FIG. 1C illustrates a rear view of the boat seat 100 of FIG. 1A in the folded position. FIG. 1D illustrates a bottom view of the boat seat 100 of FIG. 1A in the folded position. The folded position of the boat seat 100 allows the seat back 120 to be lowered while the boat seat 100 is not in use. An embodiment of the left hinge assembly 110 is described in more detail with respect to FIGS. 2A-2F. In various embodiments, the right hinge assembly 115 is constructed in a mirror image of the left hinge assembly 110 and positioned on the opposite sides of the seat back 120 and the seat bottom 130 as the left hinge assembly 110. It should be understood that a bottom surface of the seat bottom 130 may be configured to be attached to a support such as a supporting post or supporting frame to allow mounting of the boat seat 100 to a surface such as a boat or other watercraft.

Figure 2A:
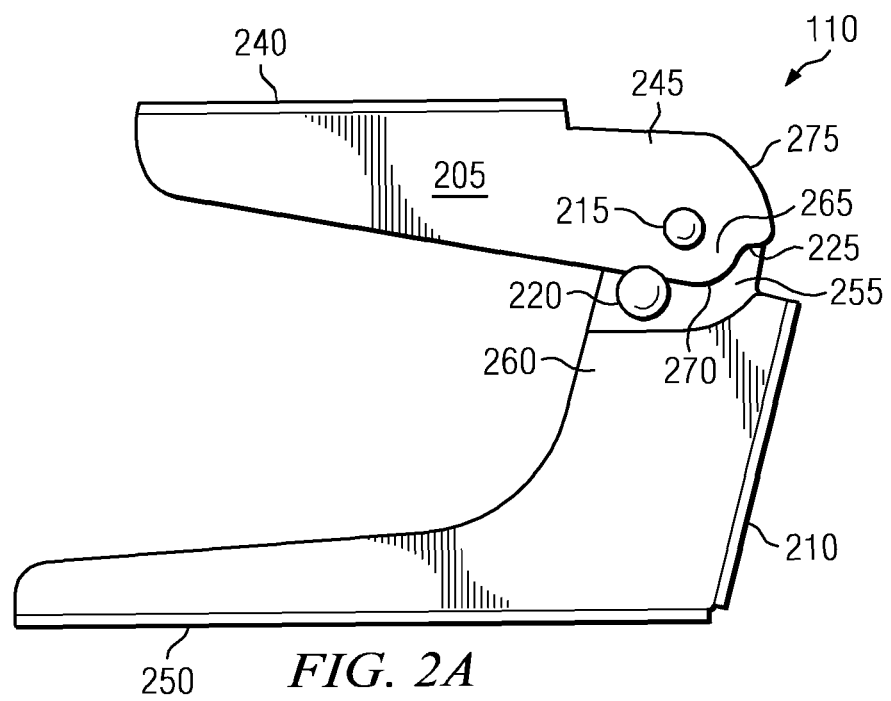
FIG. 2A illustrates a left side view of an embodiment of the left hinge assembly in a folded position.

FIG. 2A illustrates a left side view of an embodiment of the left hinge assembly 110 in a folded position. The left hinge assembly 110 includes a seat back support 205 hingedly coupled to a seat bottom support 210 by a hinge pivot 215. The seat back support 205 includes a seat back mounting portion 240 and a seat back hinge portion 245 distally located at an end of the seat back mounting portion 240. In at least one embodiment, the seat back mounting portion may be comprised of a flat plate with upper and lower parallel surfaces. The seat back mounting portion 240 is configured to allow the seat back support 205 to be attached to the seat back 120. The seat bottom support 210 includes a seat bottom mounting portion 250 and a seat bottom hinge portion 255 distally located from the seat bottom mounting portion 250.

The seat bottom mounting portion 250 is configured to allow the seat bottom support 210 to be attached to the seat bottom 130. The seat back hinge portion 245 of the seat back support 205 is coupled to the seat bottom hinge portion 255 of the seat bottom support 210 via the hinge pivot 215. In various embodiments, the hinge pivot 215 passes through the seat back hinge portion 245 of the seat back support 205 and a flat surface on the seat bottom hinge portion 255 of the seat bottom support 210. In at least one embodiment, the hinge pivot 215 is disposed in the seat back hinge portion 245 and distally positioned from the seat back mounting portion 240. The hinge pivot 215 allows the seat back support 205 to rotate about the hinge pivot 215 to allow the seat back 120 to be positioned by a user from a folded position to an extended position. In a particular embodiment, a portion of the seat back hinge portion 245 is positioned adjacent to a portion of the seat bottom hinge portion 255. In at least one embodiment, the distal end of the seat bottom hinge portion 255 has a flat surface which is recessed with respect to a first surface 260 of the seat bottom support 210. In at least one embodiment, the recessing of the seat bottom hinge portion 255 with respect to the first surface 260 allows the first surface 260 of the seat bottom support 210 to lie substantially in the same plane as a second surface 265 of the seat back hinge portion 245 that comprises one of the surfaces of the flat plate of the seat back mounting portion 245. In a particular embodiment, the seat back hinge portion 265 has a first curved edge 270 and a second curved edge 275 and the stop notch 225 is integrally formed at the intersection of the first curved edge and the second curved edge.

The left hinge assembly 110 further includes a stop pin 220 affixed to the seat bottom hinge portion 255 of the seat bottom support 210 proximate to the seat back hinge portion 245 of the seat back support 205. The seat back support 205 further includes a stop notch 225 integrally formed in the outer surface at the distal end of the seat back hinge portion 245 of the seat back support 205. In at least one embodiment, the stop notch 225 is formed of a substantially curved shape. In still other embodiments, the stop notch 225 may be formed of a substantially square, substantially rectangular shape, or any other shape. As further described with respect to FIGS. 4 and 5A-5C, the stop pin 220 is configured to engage the stop notch 215 upon rotation of the left hinge assembly 110 to the extended position to prevent further rotation of the seat back support 205 beyond the extended position.

Figure 2B:
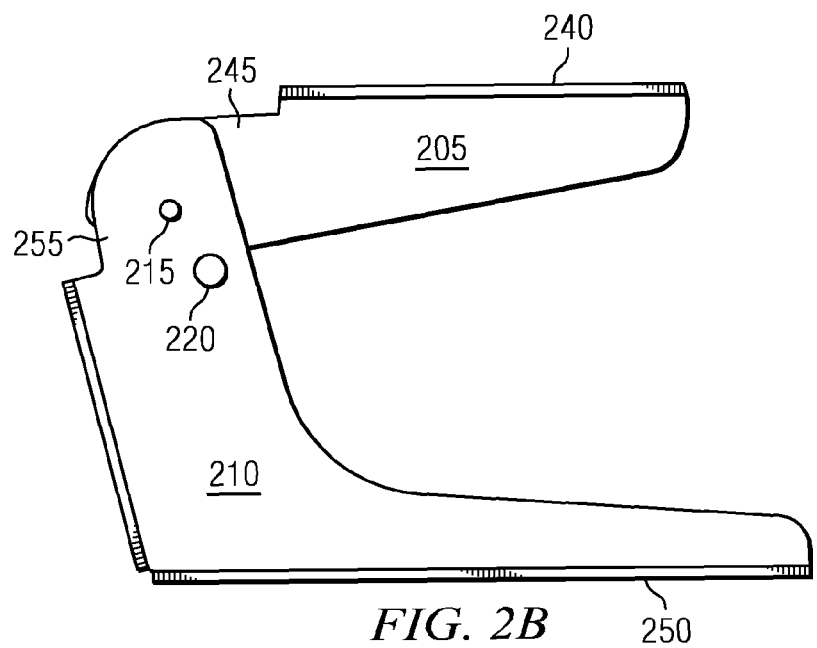
FIG. 2B illustrates a right side view of the left hinge assembly of FIG. 2A in the folded position.
Figure 2C:
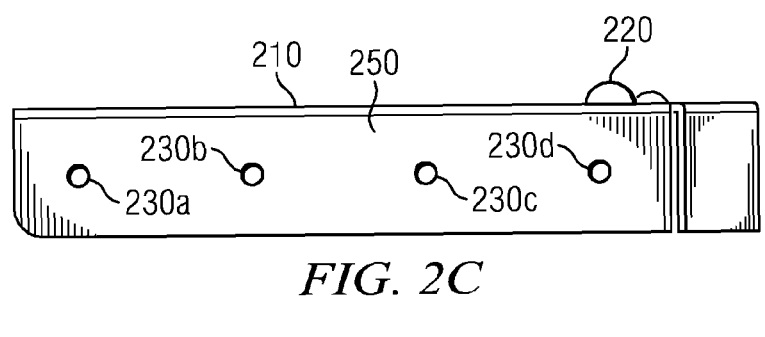
FIG. 2C illustrates a bottom view of the left hinge assembly of FIG. 2A in the folded position.
Figure 2D:
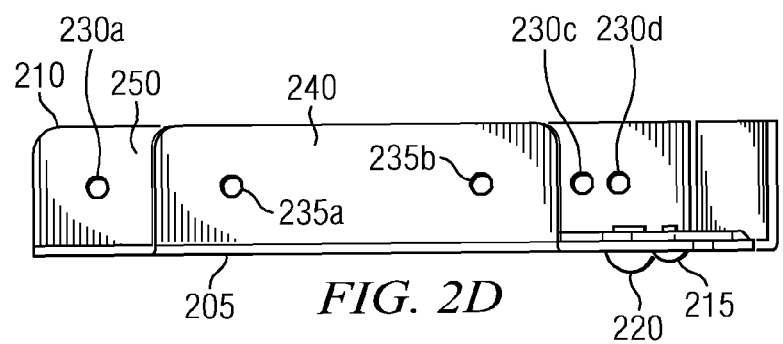
FIG. 2D illustrates a top view of the left hinge assembly of FIG. 2A.

FIG. 2B illustrates a right side view of the left hinge assembly 110 of FIG. 2A in the folded position. FIG. 2C illustrates a bottom view of the left hinge assembly 110 of FIG. 2A in the folded position. As illustrated in FIG. 2C, the seat bottom mounting portion 250 of the seat bottom support 210 further includes one or more seat bottom attachment holes 230a-230d to facilitate attachment of the seat bottom mounting portion 250 of the seat bottom support 210 to the seat bottom 130 using one or more fasteners, such as screws or bolts. FIG. 2D illustrates a top view of the left hinge assembly 110 of FIG. 2A. As illustrated in FIG. 2D, the seat back mounting portion 240 of the seat back support 205 further includes one or more seat back attachment holes 235a-235b to facilitate attachment of the seat back mounting portion 240 of the seat back support 205 to the seat back 120 using one or more fasteners.

Figure 2E:
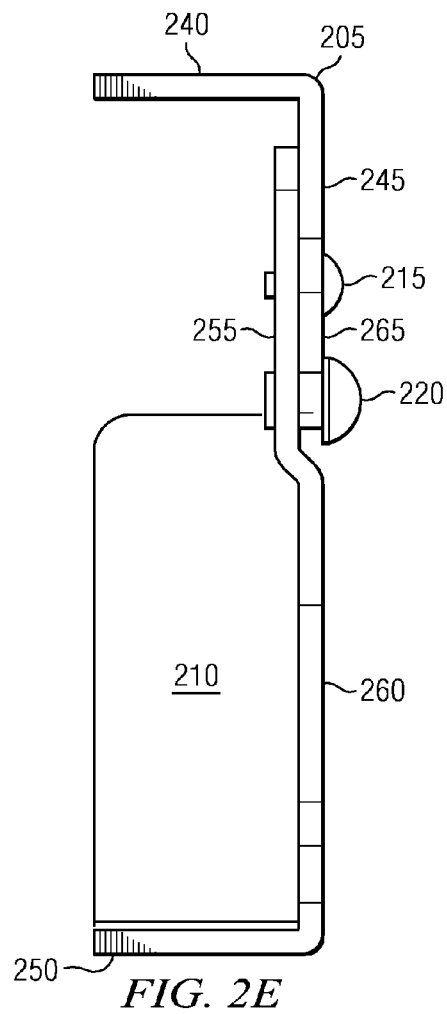
FIG. 2E illustrates a front side view of the left hinge assembly of FIG. 2A in the folded position.
Figure 2F:
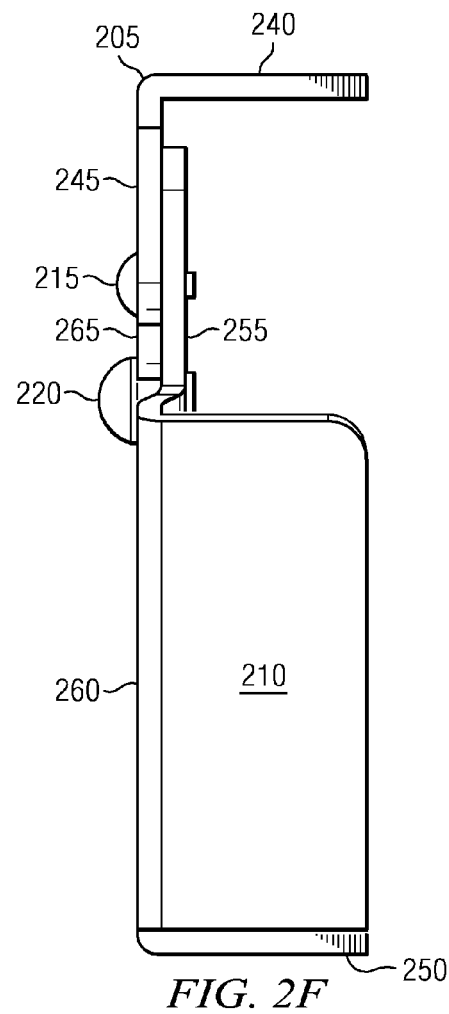
FIG. 2F illustrates a back side view of the left hinge assembly of FIG. 2A in the folded position.

FIG. 2E illustrates a front side view of the left hinge assembly 110 of FIG. 2A in the folded position. FIG. 2F illustrates a back side view of the left hinge assembly 110 of FIG. 2A in the folded position. As illustrated more clearly in FIGS. 2E and 2F, in at least one embodiment, the seat back mounting portion 240 of the seat back support 205 is disposed substantially perpendicular to a remaining portion of the seat back support 205 to facilitate attachment of the seat back mounting portion 240 to a back surface of the seat back 120. In still other embodiments, the seat back mounting portion 240 may be disposed at any angle in relation to the remaining portion of the seat back support 205. Further, in at least one embodiment, the seat bottom mounting portion 250 is disposed substantially perpendicular to a remaining portion of the seat bottom support 210 to facilitate attachment of the seat bottom mounting portion 250 to a bottom surface of the seat bottom 130. In still other embodiments, the seat bottom mounting portion 250 may be disposed at any angle in relation to the remaining portion of the seat bottom support 210.

Figure 3A:
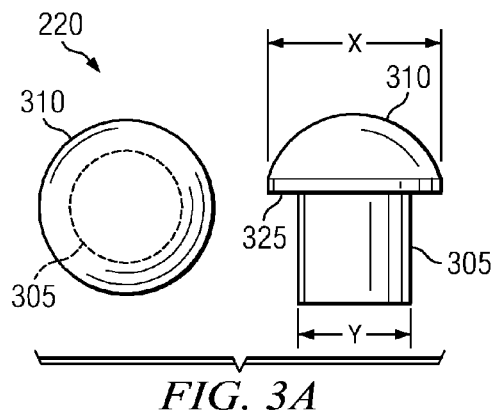
FIG. 3A illustrates an embodiment of the stop pin of the left hinge assembly of FIGS. 2A-2F.

FIG. 3A illustrates an embodiment of the stop pin 220 of the left hinge assembly 110 of FIGS. 2A-2F. The stop pin 220 includes a stop pin shaft 305 and a stop pin head 310 positioned at a first end of the stop pin shaft 305. In at least one embodiment, the stop pin head 310 has a cross-sectional diameter x greater than a cross-sectional diameter y of the stop pin shaft 305 to prevent and/or reduce slippage of the stop notch 225 over the stop pin 220 when the seat back support 205 is positioned in the extended position. In various embodiments, one or more cross-sectional dimensions of the stop pin head 310 are greater than one or more cross-sectional dimensions of the stop pin shaft 305 to form a lip portion 325 of the stop pin head 310 so as to prevent the seat back support 205 from rotating beyond the extended position. In various embodiments, the lip portion 325 comprises a lower surface of the stop pin head 310. In the embodiment illustrated in FIG. 3A, the stop pin shaft 305 has a circular cross-section and the stop pin head 310 has a curved face. In various embodiments, a second end of the stop pin shaft 305 opposite of the first end is affixed to the seat bottom hinge portion 255 of the seat bottom support 210 proximate to the seat back hinge portion 245 of the seat back support 205 and extending perpendicular thereto such that, upon rotation of the seat back support 205 to the extended position, the stop notch 225 in the seat back hinge portion 245 of the seat back support 205 comes into contact with the stop pin shaft 305 of the stop pin 220. In various embodiments, the stop pin 310 is larger than the stop pin shaft 305 and is in a plane perpendicular thereto. The lip portion 325 of the stop pin head 310 prevents and/or reduces the ability of the stop notch 225 to slide over the stop pin 220.

Figure 3B:
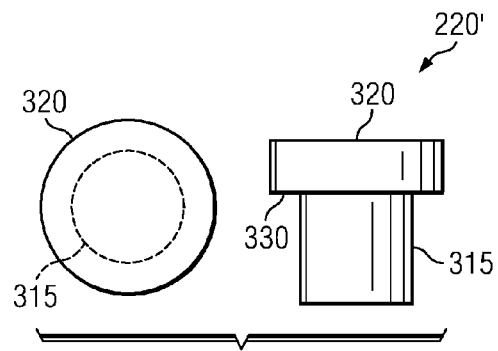
FIG. 3B illustrates another embodiment of a stop pin that may be used with the left hinge assembly of FIGS. 2A-2F.

FIG. 3B illustrates another embodiment of a stop pin 220' that may be used with the left hinge assembly 110 of FIGS. 2A-2F. The stop pin 220' includes a stop pin shaft 315 having a circular cross-section and a stop pin head 320 having a flat face and a lip portion 320. In still other embodiments, a cross-section of the stop pin shaft 315 of the stop pin head 320 may be formed of any shape, such as a square cross-section. In still other embodiments, the stop pin head 320 of the stop pin 220' may be of any configuration, such as square or oval.

Figure 4:
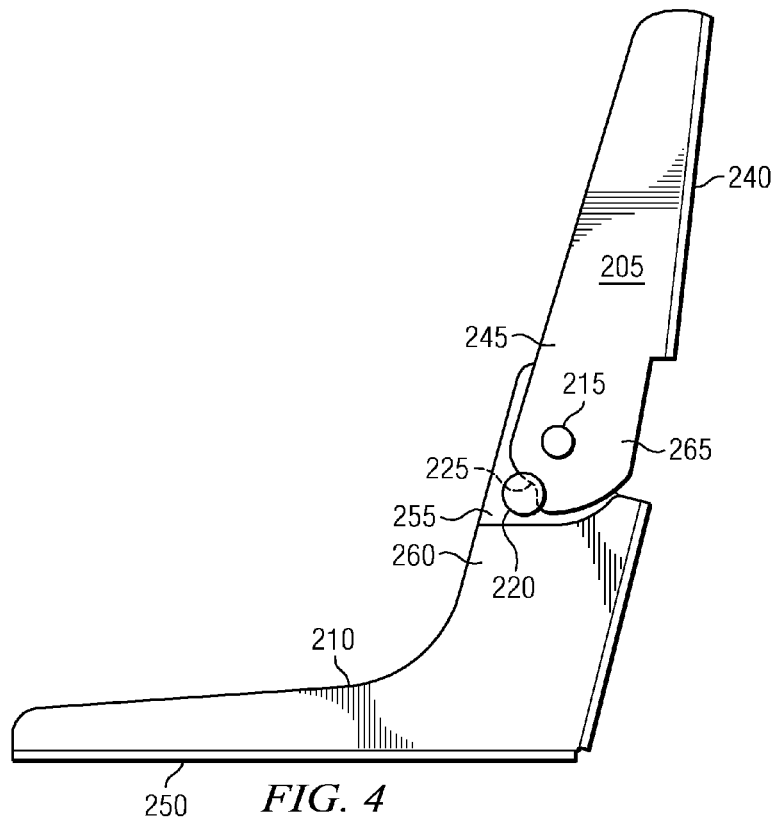
FIG. 4 illustrates a left side view of an embodiment of the left hinge assembly of FIGS. 2A-2F in an extended position.

FIG. 4 illustrates a left side view of an embodiment of the left hinge assembly 110 of FIGS. 2A-2F in an extended position. In the embodiment illustrated in FIG. 4, the seat back support 205 is positioned in the extended position such that the stop notch 225 in the seat back hinge portion 245 of the seat back support 205 is engaged with the stop pin 220 affixed to the seat bottom hinge portion 255 of the seat bottom support 210. When the seat back support 205 is positioned in the extended position, the stop notch 225 is engaged with the stop pin shaft 305 of the stop pin 220 and a portion of the second surface 265 of the seat back hinge portion 245 is disposed under the lip portion 325 of the stop pin head 310. In addition, the stop notch 225 is positioned between the lip portion 325 of the stop pin head 310 and the seat bottom hinge portion 255 of the seat bottom support 210. As a result, the ability of the stop pin notch 225 to slip past the stop pin 220 is reduced or eliminated. Accordingly, the ability of the seat back support 205 to rotate beyond the extended position with respect to the seat bottom support 210 is reduced or eliminated. In at least one embodiment, a portion of the second surface 265 of the distal end of the seat back hinge portion 245 is disposed between and guided by the lip portion 325 of the stop pin head 310 and the seat bottom hinge portion 255 during a substantial portion of the rotation of the seat back support 205 from the folded position to the extended position, without substantial contact of the seat back hinge portion 245 to the stop pin shaft 305 and/or stop pin head 310 until the stop notch 225 comes into contact with the stop pin shaft 305 of the stop pin 220 upon the seat back support 205 reaching the extended position. In at least one embodiment, the portion of the second surface 265 of the seat back hinge portion 245 is disposed between and guided by the lip portion 325 of the stop pin head 310 and the seat bottom hinge portion 255 during the entire portion of the rotation of the seat back support 205 from the folded position to the extended position such that the distal portion of the seat back hinge portion 245 slides substantially unimpeded between a lower surface of the stop pin head 310 and the flat surface of the seat bottom hinge portion 255. In another embodiment, the portion of the second surface 265 of the seat back hinge portion 245 is disposed between and guided by the lip portion 325 of the stop pin head 310 and the seat bottom hinge portion 255 during the portion of the rotation of the seat back support 205 from the folded position to the extended position subsequent to the seat back support 205 being in the folded position. In some embodiments, the rotation of the seat back support 205 from the folded position to the extended position without substantial contact of the seat back hinge portion 245 to the stop pin shaft 305 and/or stop pin head 310 may include slight or incidental contact of the stop pin shaft 305 and/or stop pin head 310 during the rotation.

An advantage that may be provided in certain embodiments by a portion of the second surface 265 of the seat back hinge portion 245 being disposed between the lip portion 325 of the stop pin head 310 and the seat bottom hinge portion 255 of the seat bottom support 210 is that undesirable lateral bending of the hinge assembly 110 and/or right hinge assembly 115 may be reduced or eliminated.

Figure 5A:
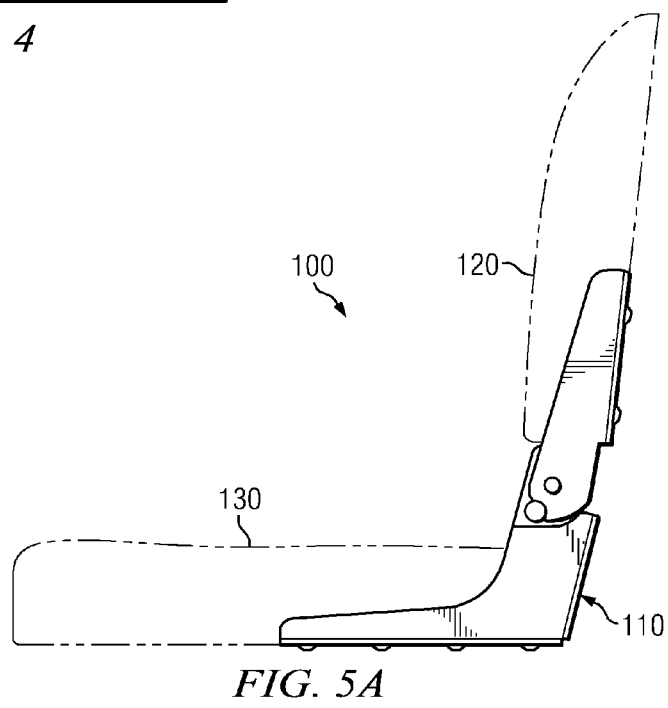
FIG. 5A illustrates a left side view of an embodiment of the boat seat in which the left hinge assembly 110 and the right hinge assembly 115 are in an extended position.
Figure 5B:
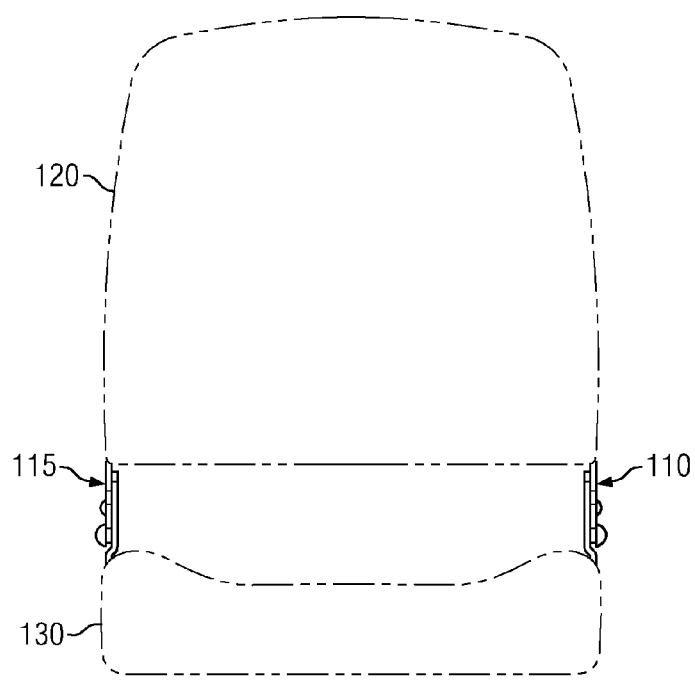
FIG. 5B illustrates a front view of the boat seat 100 of FIG. 5A in the extended position.
Figure 5C:
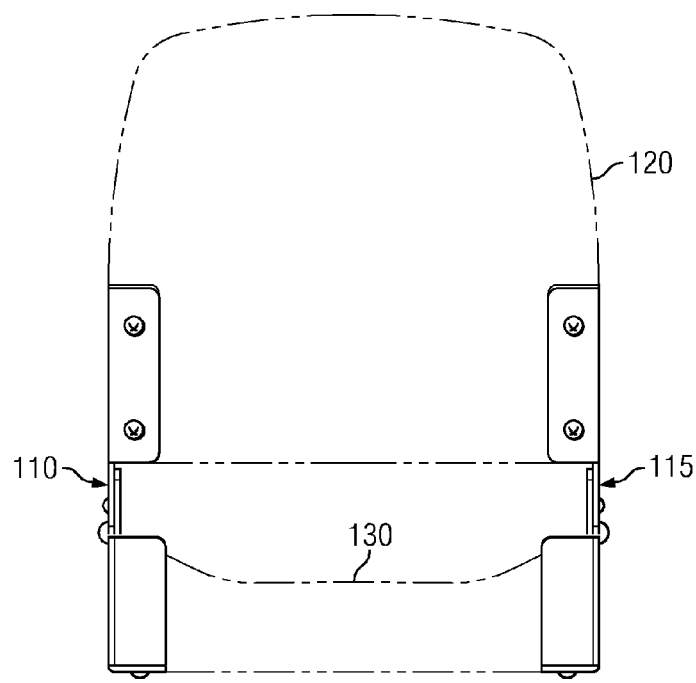
FIG. 5C illustrates a rear view of the boat seat 100 of FIG. 5A in the extended position.

Referring now to FIG. 5A, a left side view of an embodiment of the boat seat 100 in which the left hinge assembly 110 and the right hinge assembly 115 (not specifically shown in FIG. 5A) are in an extended position is illustrated. FIG. 5B illustrates a front view of the boat seat 100 of FIG. 5A in the extended position. FIG. 5C illustrates a rear view of the boat seat 100 of FIG. 5A in the extended position. As illustrated in FIGS. 5B-5C, both the left hinge assembly 110 and the right hinge assembly 115 are positioned in the extended position resulting in the seat back 120 being in the raised or extended position. The extended position of the seat back 120 of the boat seat 100 allows seating of a user on the boat seat bottom 130 and support of the back of the user by the seat back 120. The stop pin 220 prevents or reduces the ability of the seat back 120 to be rotated past the extended position. In at least one embodiment, the stop pin 220 provides an advantage of preventing or reducing injury to a user that may result due to the seat back 120 rotating past the extended position.

Although the embodiment of the left hinge assembly 110 has been described as a component of a boat seat 100, it should be understood that in other embodiments the hinge assembly 110 may be applied to any type of foldable seat having a seat back with a capability to be rotated into an extended position. For example, the left hinge assembly 110 may be used as a seat hinge for any portable folding seat such as those designed to be carried to sporting events or other outdoor activities.

It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A hinge assembly comprising:
a seat back support having a seat back mounting portion and a seat back hinge portion distally located from the seat back mounting portion, the seat back hinge portion including a stop notch formed at an end of the seat back hinge portion;
a seat bottom support having a seat bottom mounting portion and a seat bottom hinge portion distally located from the seat bottom mounting portion;
a hinge pivot positioned distally from the seat back mounting portion and passing through the seat back hinge portion and the seat bottom hinge portion to hingedly couple the seat back hinge portion to the seat bottom hinge portion; and
a stop pin having a stop pin shaft and a stop pin head positioned at a first end of the stop pin shaft, a second end of the stop pin shaft affixed and secured to a surface of the seat bottom hinge portion of the seat bottom support proximate to the seat back hinge portion of the seat back support, the stop pin shaft of the stop pin being configured to engage the stop notch upon rotation of the seat back support from a folded position to an extended position, wherein the stop pin head has a cross-sectional diameter greater than a cross-sectional diameter of the stop pin shaft to restrain lateral movement of the seat back support from the plane of movement; and
wherein a distal end of the seat back hinge portion is disposed between and guided by the stop pin head of the stop pin and the seat bottom hinge portion of the seat bottom support during a substantial portion of rotation of the distal end of the seat back support from the folded position to the extended position, without substantial contact of the seat back hinge portion to the stop pin shaft until the stop notch comes into contact with the stop pin shaft upon the seat back support reaching the extended position to prevent lateral movement outward of the distal end relative to the surface of the seat bottom hinge portion.

2. The hinge assembly of claim 1, wherein the seat back mounting portion is configured to allow the seat back support to be attached to a seat back.

3. The hinge assembly of claim 2, wherein the seat back mounting portion includes one or more seat back attachment holes to facilitate attachment of the seat back mounting portion of the seat back support to the seat back.

4. The hinge assembly of claim 2, wherein the seat back mounting portion of the seat back support is disposed substantially perpendicular to a remaining portion of the seat back support to facilitate attachment of the seat back mounting portion to a back surface of the seat back.

5. The hinge assembly of claim 1, wherein the seat bottom mounting portion is configured to allow the seat bottom support to be attached to a seat bottom.

6. The hinge assembly of claim 5, wherein the seat bottom mounting portion further includes one or more seat bottom attachment holes to facilitate attachment of the seat bottom mounting portion of the seat bottom support to the seat bottom.

7. The hinge assembly of claim 5, wherein the seat bottom mounting portion is disposed substantially perpendicular to a remaining portion of the seat bottom support to facilitate attachment of the seat bottom mounting portion to a bottom surface of the seat bottom.

8. The hinge assembly of claim 1, wherein the stop notch is formed of a substantially curved shape.

9. The hinge assembly of claim 1, wherein the stop notch is formed of a substantially rectangular shape.

10. A hinge assembly comprising:
a seat back support having a seat back mounting portion comprised of a longitudinal flat plate with upper and lower parallel surfaces and a seat back hinge portion distally located at an end of the seat back mounting portion, the seat back hinge portion including a stop notch integrally formed in the outer surface at the distal end of the seat back hinge portion;
a seat bottom support having a seat bottom mounting portion and a seat bottom hinge portion distally located from the seat bottom mounting portion, wherein the distal end of the seat bottom hinge portion has a flat surface which is recessed with respect to a first surface of the seat bottom support, the recessing of the seat bottom hinge portion with respect to the first surface allowing the first surface of the seat bottom support to lie substantially in the same plane as a second surface of the seat back hinge portion that comprises one of the surfaces of the flat plate of the seat back mounting portion;
a hinge pivot positioned distally from the seat back mounting portion proximate to the end of the flat plate and passing there through and through the flat surface on the seat bottom hinge portion to hingedly couple the seat back hinge portion to the seat bottom hinge portion;
a stop pin having a stop pin shaft and a stop pin head positioned at a first end of the stop pin shaft, a second end of the stop pin shaft affixed and secured to a surface of the seat bottom hinge portion of the seat bottom support proximate to the seat back hinge portion of the seat back support and extending perpendicular thereto, the stop pin head being larger than the stop pin shaft and in a plane perpendicular thereto, wherein the stop pin head has a cross-sectional diameter greater than a cross-sectional diameter of the stop pin shaft to restrain lateral movement of the seat back support from the plane of movement, and the stop pin shaft of the stop pin being configured to engage the stop notch upon rotation of the seat back support from a folded position to an extended position; and
wherein the distal end of the seat back hinge portion is disposed between and guided by the stop pin head of the stop pin and the seat bottom hinge portion of the seat bottom support during a substantial portion of rotation of the distal end of the seat back support from the folded position to the extended position to prevent lateral movement outward of the distal end relative to the surface of the seat bottom hinge portion and such that the distal end of the seat back hinge portion slides substantially unimpeded between a lower surface of the stop pin head and the flat surface of the seat bottom hinge portion, without substantial contact of the seat back hinge portion to the stop pin shaft until the stop notch comes into contact with the stop pin shaft upon the seat back support reaching the extended position.

11. The hinge assembly of claim 10, wherein the seat back mounting portion includes one or more seat back attachment holes to facilitate attachment of the seat back mounting portion of the seat back support to a seat back.

12. The hinge assembly of claim 10, wherein the seat back mounting portion of the seat back support is disposed substantially perpendicular to a remaining portion of the seat back support to facilitate attachment of the seat back mounting portion to a back surface of a seat back.

13. The hinge assembly of claim 10, wherein the seat bottom mounting portion further includes one or more seat bottom attachment holes to facilitate attachment of the seat bottom mounting portion of the seat bottom support to a seat bottom.

14. The hinge assembly of claim 10, wherein the seat bottom mounting portion is disposed substantially perpendicular to a remaining portion of the seat bottom support to facilitate attachment of the seat bottom mounting portion to a bottom surface of a seat bottom.

15. The hinge assembly of claim 10, wherein the stop notch is formed of a substantially curved shape.

16. The hinge assembly of claim 10, wherein the stop notch is formed of a substantially rectangular shape.

* * * * *